Patented Dec. 1, 1931

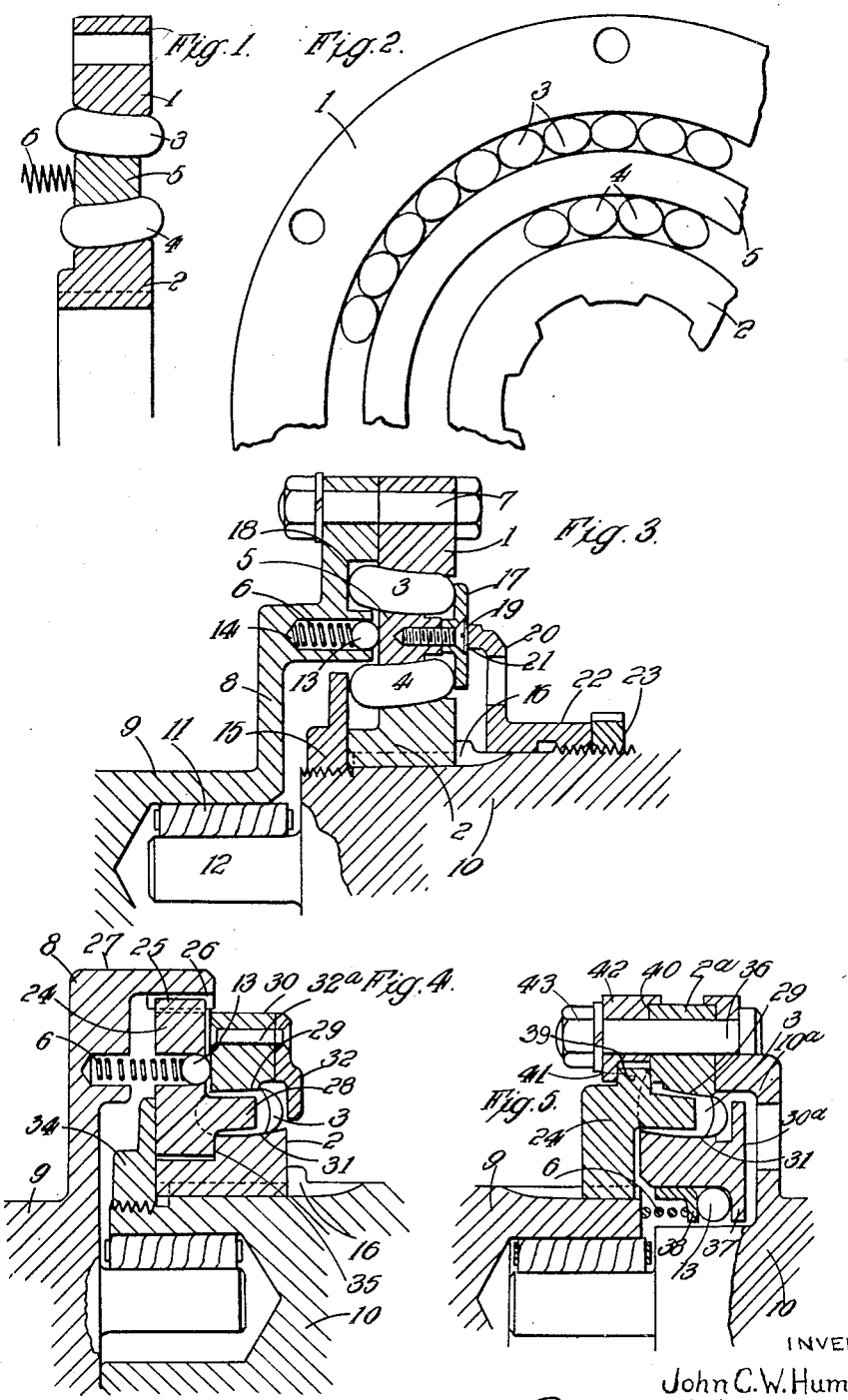

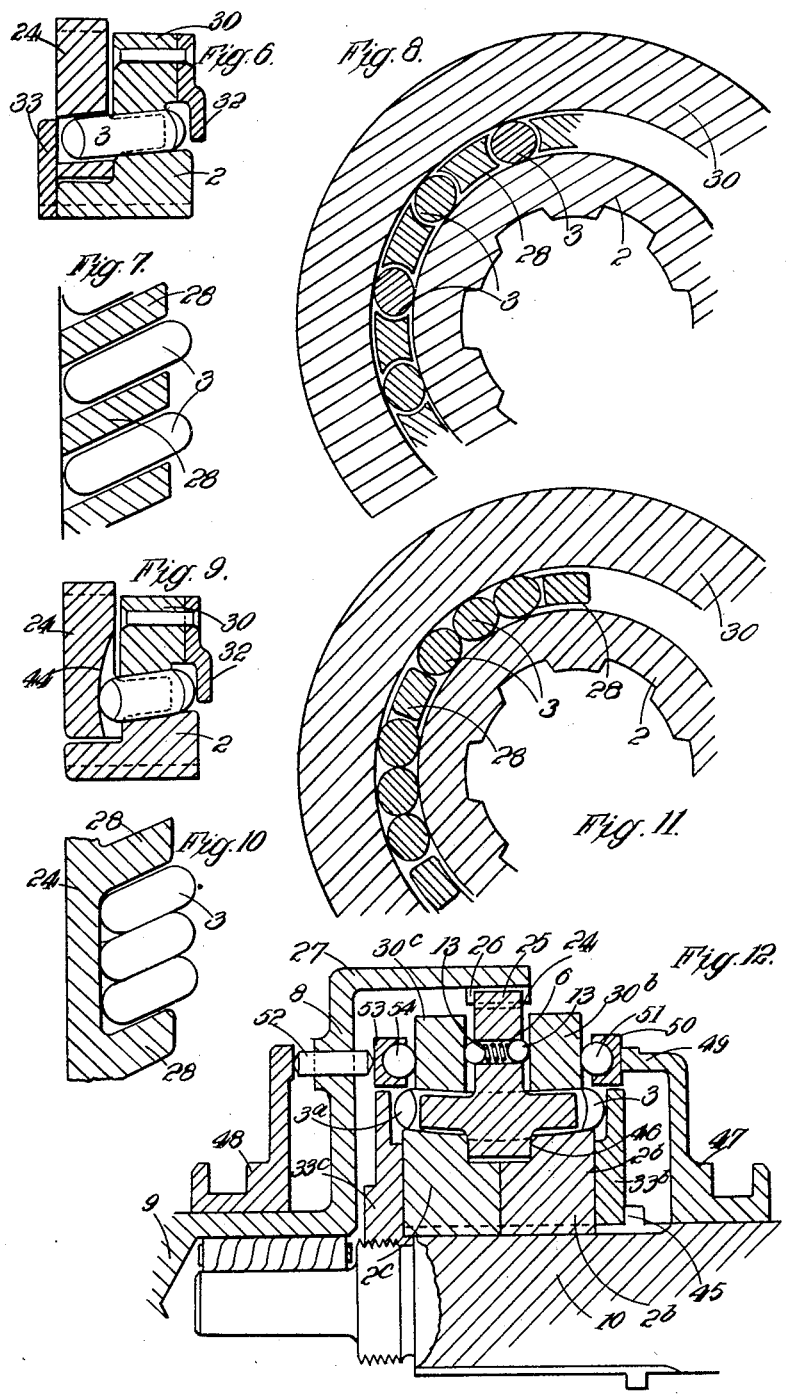

1,834,843

UNITED STATES PATENT OFFICE

JOHN CHARLES WILLIS HUMFREY, OF LONDON, ENGLAND, ASSIGNOR TO HUMFREY-SANDBERG COMPANY, LIMITED, OF LONDON, ENGLAND

FREE-WHEEL CLUTCH WITH SKEW ROLLERS

Application filed December 11, 1929, Serial No. 413,330, and in Great Britain January 17, 1929.

In United States Patent No. 1,670,197, dated May 15, 1928, a type of free-wheel clutch which may be called a skew roller clutch is described consisting of concentric inner and outer members having conoidal or cylindrical surfaces and rollers lying in the annular space between these surfaces, so that the axes of the rollers are inclined to, but are not in the same plane, as the axis of the members. The surfaces with which the rollers engage are so formed that the rollers make full line contact with each member throughout their length.

In one direction of relative rotation between the members the reaction on the rollers gives rise to frictional forces at right angles to the axes of the rollers, a component of which tends to cause a relative axial displacement between the inner and outer members and to wedge the rollers between them. If the rotation is reversed, the resolved component causes a relative axial movement between the inner and outer members tending to disengage the rollers.

In the constructions shown in said prior patent there was the drawback that the relative axial movements, necessary for the engagement and release of the clutch, and the effective spring pressure might be restrained by forces due to the method of applying or transmitting torque from the driving or driven members.

This drawback is obviated according to the present invention by the arrangement in which the driving and driven clutch members are secured against relative axial displacement and the required axial movement between the rollers and their races is effected by a floating member provided with a race or races for the rollers.

In one form of the invention, two sets of concentrically arranged, but oppositely inclined, rollers are provided, one set engaging with a race carried by the outer clutch member and with a race carried by the floating member, while the other set engages with a race carried by the said member and with a race carried by the inner clutch member.

The requisite axial movements for engagement and disengagement occur entirely in the intermediate member which is floating between the rollers and can be allowed axial movement in either direction against a spring, tending to force it into the engaged position, if the device is to function purely as a unidirectional ratchet clutch, or may be positively controlled as regards axial movement, if the device is to be used as a slipping clutch.

In a modified form of the invention in which a single set of rollers is employed, these rollers are contained in a cage through which the torque is transmitted from the driving to the driven shaft, the axial movements for the engagement and release of the clutch being effected, as in the preceding construction, by means of a floating member carrying one race for the rollers, the other race being carried by a clutch member secured to the driving or driven shaft.

The cage is made sufficiently strong to transmit the load, and the rollers may be contained in slots provided between axially projecting and correspondingly inclined abutments or prongs of the cage, but two or more rollers may lie in the same slot.

Similar arrangement of members and rollers may be constructed according to British Patent No. 295,481, dated June 30, 1927, the disposition of the outer, intermediate and inner members being as described above, but the surfaces of the members in contact with the rollers being in some cases cylindrical or conical, and the rollers and opposite faces being suitably shaped to give full line contact when the axes of the rollers are inclined to, but not in the same plane as, the axis of the members.

In the accompanying drawings which represent examples of clutches according to the invention—

Fig. 1 is a part sectional elevation of the construction in which two sets of rollers are used and Fig. 2 is a corresponding end view.

Fig. 3 is a part sectional elevation of a clutch with two sets of rollers with means for adjusting the slip.

Fig. 4 is a part sectional elevation of a modification in which the torque is transmitted from the driving shaft to the cage and the outer roller race is carried by the floating member.

Fig. 5 is a part sectional elevation of a modification in which the torque is transmitted from the driving shaft to the cage and the inner roller race is carried by the floating member.

Fig. 6 is a part section,

Fig. 7 a part sectional plan, and

Fig. 8 a part sectional end elevation of a clutch, showing the arrangement of the rollers in the cage, in a construction in which a single roller is inserted between adjacent prongs of the cage.

Figs. 9, 10 and 11 are views respectively similar to Figs. 6, 7 and 8 showing the arrangement of the rollers in the cage of a clutch in which a plurality of rollers is inserted between adjacent prongs of the cage.

Fig. 12 is a sectional elevation of a biconoidal free-wheel clutch adapted for driving in either direction of rotation.

In Figs. 1 and 2 which represent diagrammatically the general arrangement of the double roller clutch, 1 is the outer clutch member, 2 the inner clutch member, 3 the rollers of the outer set, 4 the rollers of the concentric inner set and 5 is an intermediate floating member which under the action of a spring 6 tends to move axially into the position in which the two clutch members are in engagement, and which is automatically moved against the action of the spring by the axial component of the frictional resistance between the rollers and their contacting surfaces to release the clutch when the driven member over-runs the driving member.

The axes of the rollers 3, 4 are inclined in opposite directions to the common axis about which the members 1 and 2 rotate. The internal convex surface of the outer clutch member 1 is opposite to the outer concave surface of the intermediate conoidal member 5, the internal convex surface of which is opposite to the outer concave surface of the inner clutch member 2. The smallest diameters of the conoids on the member 1 and the outer surface of the member 5 are on opposite end faces (in the example illustrated, on the right hand end faces in Fig. 1 to those on the inner surface of the member 5 and the outer surface of the member 2.

The clutch members 1 and 2, one of which is the driving and the other the driven member, are fixed as regards relative axial movement.

In the double roller clutch shown in Fig. 3, in which the general arrangement of the rollers and their races is as represented in Figs. 1 and 2, the outer clutch member 1 is secured by bolts 7 to a peripheral circular flange 8 of the driving shaft 9.

The inner clutch member 2 is splined to the driven shaft 10, rollers 11 being interposed between the reduced end 12 of the shaft 10 and the recessed end of the shaft 9.

The floating intermediate member 5 is pressed into the engaged position of the clutch by balls 13 under the action of springs 6 inserted in tubular recesses 14 provided in the flange 8.

The inner clutch member 2 is prevented from axial movement to the left (Fig. 3) by a circular plate 15 screw-threaded on the shaft 10 and against axial movement to the right in this figure by a collar 16 integral with the shaft 10. A disc 17 acts as an end plate for the rollers on the right hand side in this figure, and the plate 15 and the base of a recess 18 in the flange 8 act as retaining plates at the other ends of the roller races. The disc 17 is connected to the floating member 5 by screws 19.

The slip at a predetermined value of the load torque is adjusted by a ring 20, the projecting edge 21 of which bears against the plate 17, said ring having an axial extension 22 screw-threaded on the shaft 10 and locked in the required axial position by a nut 23.

In the clutch shown in Fig. 4, the torque is transmitted through a cage 24 containing the rollers 3, and teeth 25 on the periphery of the cage which engage with internal teeth 26 on the axially projecting rim 27 of the flange 8 of the driving shaft 9. The rollers 3, inserted in slots between the prongs 28 of the cage, engage with an internal race 29 formed in the floating member 30 and with an external race 31 formed on the inner clutch member 2 splined to the driven shaft 10. An end plate 32 for the rollers is provided at the large end of the races and connected by rivets 32$^a$ to the floating member 30.

The cage 24 is prevented by a plate 34, screw-threaded on the shaft 10, from axial displacement to the left and by a shoulder 35 of the clutch member 2 from displacement to the right, in Fig. 4. The thrust in either direction is consequently taken up by these parts and is self-contained.

The floating member 30 is, as in the clutch shown in Fig. 3, pressed to the right in Fig. 4 to engage the clutch by the balls 13 under the action of the springs 6 and is automatically moved to the left to release the clutch when the driven shaft 10 overruns the driving shaft 9.

In the modification shown in Fig. 5, the cage 24 is splined to the driving shaft 9 so that its body portion forms a driving clutch member, and the driven clutch member 2$^a$ is secured to the flange 10$^a$ of the driven shaft 10 by bolts 36. The floating member 30$^a$ carries the inner roller race 31 and the clutch member 2$^a$ carries the outer roller race 29. A flange 37 on the floating member 30$^a$ carrying the inner roller race 31 is pressed to the right to engage the clutch by balls 13 under the action of a spring 6 placed between the end of the shaft 9 and the flange of a ring 38 secured to the member $30^a$. The balls 13 are inserted between this flange and the flange 37 on the member $30^a$.

Axial thrust is taken up by an annular projection 39 on the cage 24 engaging between one end 40 of the clutch member $2^a$ and a flange 41 of a ring 42 secured by the bolts 36 and nuts 43 to the member $2^a$.

Figs. 6, 7 and 8 show details of the arrangement of the rollers 3 in the cage 24 where each roller is placed in a slot between two prongs 28.

The floating member 30 carries at the large end of the races a roller retaining end plate 32 and the retaining plate 33 at the smaller ends of the races is carried by the inner clutch member 2.

In the example illustrated in these figures the prongs 28 are concave on the sides engaging with the rollers.

Figs. 9, 10, 11 are views similar to Figs. 6, 7 and 8 but they show more than one roller inserted in a slot between adjacent prongs. In this example as shown, the surfaces of the prongs of the cage abutting against the rollers are plane. The rollers are retained at the smaller ends of the races by the metal body of the cage 24, which is hollowed out as shown at 44.

Fig. 12 shows an example of a biconoidal free-wheel clutch by which the shaft 10 can be driven in either direction of rotation by the shaft 9.

The arrangement illustrated is generally similar to that shown in Fig. 4.

The rollers 3 and $3^a$ inserted in the cage 24 are inclined in the same direction to the axis of the shafts 9 and 10 or a common set of long rollers may pass through the cage.

The cage 24 is driven by teeth 25 gearing with teeth 26 provided in the inside of the axial projection 27 of the flange 8 of the shaft 9. The inner clutch members $2^b$, $2^c$ are splined to the shaft 10. End plates $33^b$ and $33^c$ are provided at the larger ends of the races of the members $2^b$ and $2^c$. The end plate $33^c$ is screw-threaded on the shaft 10 and the end plate $33^b$ is locked between the end surface of the member $2^b$ and the collar 45.

The axial thrust is taken up by these end plates and by the internal annular projection 46 of the cage 24, which has a loose running fit between shoulders provided at the abutting recessed ends of the members $2^b$ and $2^c$.

Springs 6 and balls 13 lodged in holes provided in the cage 24 tend to move the floating members $30^b$ and $30^c$, which carry the outer races of the rollers 3 and $3^a$ into the positions in which the clutch is engaged. The inner roller races are provided in the clutch members $2^b$, $2^c$.

Slip at any predetermined value of the load is adjusted by rings 47 and 48 adapted to slide axially, respectively, on the shafts 10 and 9. An axial extension 49 of the peripheral flange of the ring 47 abuts against an annular member 50 containing balls 51 in contact with the outer end of the floating member $30^b$. The peripheral flange of the ring 48 abuts against pins 52 sliding axially in the peripheral flange 8 of the shaft 9 and abutting against an annular member 53 containing balls 54 in contact with the outer end of the floating member $30^c$.

The operation of the clutch is as follows, referring more particularly by way of example to the construction shown in Fig. 4.

Under normal running conditions, the floating member 30 is urged axially to the right by the balls 13 and the springs 6. Owing to the conoidal form of the outer race 29 in the member 30 and of the inner race 31 of the inner clutch member 2 (the larger diameter of both races in which the rollers 3 rotate being on the right of this figure), the rollers are gripped between the surfaces with which they contact. As explained more fully in U. S. Patent No. 1,670,197 and the British patents referred to above, a component of the force due to the friction at the engaging surfaces, depending upon the inclination of the rollers and the direction of the torque transmitted, causes the floating member 30 to be moved further in the same axial direction and thereby to wedge the rollers 3 more tightly between the outer race 29 and the inner race 31. The load torque is, consequently, transmitted through the cage 24 from the driving to the driven shaft; for example from the shaft 9 by the teeth 25 and 26 to the cage 24 and from the cage by the rollers 3 to the clutch member 2.

Should the driven member over-run the driving member, the direction in which the torque is transmitted is reversed, and with it the direction of the frictional component, with the result that the floating member 30 is moved axially to the left in Fig. 4, overcoming the force due to the springs 6 and thus disengaging the coupling.

Slip at a predetermined value of the load torque is provided for by adjustable flanged rings, such as the rings 20 in Fig. 3 and the rings 47 and 48 in Fig. 12, which engage with the floating member and abut on the driven member or an attachment thereto so as to restrict the axial movement of the floating member in the direction to wedge the rollers between their races.

Having thus described the nature of the said invention and the best means I know of carrying the same into practical effect, I claim:—

1. A free-wheel clutch of the skew roller type for connecting two coaxial shafts, said clutch comprising a driving element and a driven element secured, respectively, to said shafts, means for securing said elements against relative axial displacement, an annular floating member movable axially of said driving and driven elements, said floating member and one of said clutch elements each having a roller race thereon, and means including skew rollers interposed between said races and operative by the axial movement of said floating member to effect the engagement and release of the clutch elements.

2. A free-wheel clutch according to claim 1, in which said driving and driven elements are formed as inner and outer members and are both provided with roller races and said floating member is provided with a plurality of roller races, and in which the means to effect the engagement and release of the clutch elements comprises two concentrically arranged sets of rollers, one set of rollers engaging the race on said inner member and a race on said floating member, and the other set of rollers engaging a race on said floating member and the race on said outer member, the axes of the rollers of said roller sets being respectively inclined in opposite directions to the common axis of said members.

3. A free-wheel clutch according to claim 1, in which said driving and driven elements are formed as inner and outer members and are both provided with roller races and said floating member is provided with a plurality of roller races, and in which the means to effect the engagement and release of the clutch elements comprises two concentrically arranged sets of rollers, one set of rollers engaging the race on said inner member and a race on said floating member, and the other set of rollers engaging a race on said floating member and the race on said outer member, the axes of the rollers of the two sets being respectively inclined in opposite directions to the common axis of said members, and resilient devices tending to move said floating member axially into the position in which the said clutch members are in operative engagement.

4. A free-wheel clutch according to claim 1, in which said driving and driven elements are formed as inner and outer members and are both provided with roller races and said floating member is provided with a plurality of roller races, and in which the means to effect engagement and release of the clutch elements comprises two concentrically arranged sets of rollers, one set of rollers engaging the race on said inner member and a race on said floating member, and the other set of rollers engaging a race on said floating member and the race on said outer member, a flange on one of said shafts, provided with symmetrically spaced recesses, a spring disposed in each of said recesses, and a ball in each recess forced by said spring into contact with said floating member to move it axially between said sets of rollers and thereby effect the operative engagement of said clutch members.

5. A free-wheel clutch according to claim 1, in which said driving and driven elements are formed as inner and outer members and are both provided with roller races and said floating member is provided with a plurality of roller races, and in which the means to effect engagement and release of the clutch elements comprises two concentrically arranged sets of rollers, one set of rollers engaging the race provided in said inner member and a race on said floating member, and the other set of rollers engaging a race on said floating member and the race on said outer member, the axes of said roller sets being inclined in opposite directions to the common axis of said members, resilient devices tending to move said floating member axially into the position in which the said clutch members are in operative engagement, and means for limiting said axial movement in order that the clutch should slip at a predetermined value of the load torque.

6. A free-wheel clutch according to claim 1, in which said driving and driven elements are formed as inner and outer members and are both provided with roller races and said floating member is provided with a plurality of roller races, and in which the means to effect engagement and release of the clutch elements comprises two concentrically arranged sets of rollers, one set of rollers engaging the race on said inner member and a race on said floating member, and the other set of rollers engaging a race on said floating member and the race on said outer member, the axes of said roller sets being inclined in opposite directions to the common axis of said members, resilient devices tending to move said floating member axially into the position in which the said clutch members are in operative engagement, a plate secured to said floating member, and a member axially adjustable on one of said shafts engaging with said plate and limiting the axial movement of said floating member in the direction to effect the operative engagement of said clutch members.

7. A free-wheel clutch according to claim 1, in which said driving and driven elements are formed as inner and outer members and are both provided with roller races and said floating member is provided with a plurality of roller races, and in which the means to effect engagement and release of the clutch elements comprises two concentrically arranged sets of rollers, one set of rollers engaging the race on said inner member and a race on said floating member, and the other set of rollers engaging a race on said floating member and the race on said outer member, the axes of said roller sets being inclined in opposite directions to the common axis of said members, resilient devices tending to move said floating member axially into the position in which the said clutch members are in operative engagement, a plate carried by said floating member, a sleeve axially adjustable on the one of said shafts carrying said inner clutch member, and a flange on said sleeve engaging with said plate and limiting the axial movement of said floating member in the direction to effect the operative engagement of said clutch members.

8. A free-wheel clutch according to claim 1, in which said driving and driven elements are formed as inner and outer members, the securing means for which comprises a flange on one shaft with which said outer member engages and a bolt securing said outer member to said flange, a spline for securing said inner member to the other of said shafts, and collars secured to said last-mentioned shaft abutting against and preventing axial movement of said inner member.

9. A free-wheel clutch of the skew roller type for connecting two coaxial shafts, comprising a driving element and a driven element secured, respectively, to said shafts, means for securing said elements against relative axial displacement, an annular floating member movable axially of said driving and driven elements, a cage operatively connected to one of said shafts, and skew rollers uniformly spaced in said cage, outer and inner races for said rollers being provided on said floating member and the clutch element secured to the other of said shafts and operative with respect to said rollers, by the axial movement of said floating member, to effect the engagement and release of the clutch elements.

10. A free-wheel clutch according to claim 9, comprising also means by which the torque is transmitted from the driving to the driven element by said cage.

11. A free-wheel clutch according to claim 9, in which one of said elements has teeth thereon and said cage has teeth thereon engaging with the teeth on said element for transmitting torque from the driving to the driven element.

12. A free-wheel clutch according to claim 9, comprising also means by which the torque is transmitted from the driving to the driven element by said cage, resilient means operating to move said floating member axially into the position in which said clutch elements are in operative engagement, and a collar splined to one of said shafts preventing axial displacement of the clutch element connected to said shaft.

13. A biconoidal clutch of the skew roller type for connecting two coaxial shafts, comprising a pair of inner clutch elements secured to one of said shafts, a clutch element secured to the other shaft, a conoidal roller race carried by each of said inner elements, two annular floating members movable axially of said clutch elements and each having a conoidal roller race thereon, a cage containing two sets of skew rollers cooperative with said races, the axes of said rollers being inclined in the same direction relatively to the common axis of said shafts, and means for transmitting the torque between the clutch elements on said shafts by said cage.

14. A biconoidal clutch according to claim 13, in which said pair of inner clutch elements are similar and are splined to their shaft and the floating members are concentric with said inner clutch elements, and in which the two sets of rollers contained by the cage engage respectively the races on said floating members and on said inner clutch elements, and in which said cage is operative to transmit the torque between the clutch elements on said shafts through the one or the other of said sets of rollers.

15. A biconoidal clutch according to claim 13, in which the two sets of rollers contained by the cage engage respectively the races on said floating members and on said inner clutch elements, and comprising also resilient means tending to move each of said floating members axially into operative engagement with the corresponding set of rollers.

16. A biconoidal clutch according to claim 13, in which the two sets of rollers contained by the cage engage respectively the races on said floating members and on said inner clutch elements, and comprising also resilient means tending to move each of said floating members axially into operative engagement with the corresponding set of rollers, and means limiting said axial movement.

17. A biconoidal clutch according to claim 13, in which the two sets of rollers contained by the cage engage respectively the races on said floating members and on said inner clutch elements, and the means for transmitting the torque comprises teeth on the external periphery of said cage and teeth on the internal periphery of said other clutch element engaging therewith.

In testimony whereof I have signed my name to this specification.

JOHN CHARLES WILLIS HUMFREY.